United States Patent Office 3,509,230
Patented Apr. 28, 1970

3,509,230
THERMOSETTABLE EPOXY RESIN ADHESIVE COMPOSITIONS CONTAINING FLEXIBILIZING AMOUNTS OF A THERMOPLASTIC POLYMERIC MODIFIER BASED ON A POLYMERIZED ALKYL ESTER OF ACRYLIC ACID
James A. Clarke, Lake Jackson, Tex., assignor to The Dow Chemical Company, Midland, Mich., a corporation of Delaware
No Drawing. Continuation-in-part of application Ser. No. 535,008, Mar. 17, 1966. This application Dec. 4, 1968, Ser. No. 782,791
Int. Cl. C08g 45/04
U.S. Cl. 260—836                    4 Claims

ABSTRACT OF THE DISCLOSURE

This invention relates to improved thermosettable resin adhesive compositions. More particularly, the invention concerns epoxy resins containing from about 0.5 to 5 parts by weight, per hundred parts of epoxy resin, of a compatible thermoplastic polymeric modifier composed of at least about 45 weight percent of a polymerized alkyl ester of acrylic acid containing from 1 to 4 carbon atoms in the alkyl constituent with any remainder being one or more monoethylenically unsaturated comonomers.

---

This application is a continuation-in-part of my copending application, Ser. No. 535,008, filed Mar. 17, 1966, now abandoned.

It is desirable to provide epoxy resin formulations which are capable of rapid curing to form essentially non-tacky, flexible, thermoset materials having excellent adhesion to metals. Heretofore, efforts to achieve such results have included utilization of flexibilizing curing agents such as the polyamides, which have been found to be generally incapable of producing an acceptable rate of cure; or polyalkylene polyamine curing agents, such as diethylenetriamine and the like, which provide an acceptable cure rate but which form undesirably brittle thermoset materials.

According to our invention, rapid curing, essentially non-tacky epoxy resin adhesive compositions having significantly enhanced flexibility are prepared by addition to the epoxy resin, prior to curing thereof, of from about 0.5 to about 5 parts per hundred parts of epoxy resin (phr.) of a thermoplastic polymeric modifier which is compatible with the epoxy resin when admixed therewith in the required amounts, and which is composed of at least about 45 weight percent of a polymerized alkyl ester of acrylic acid of the formula $H_2C=CH—COOR$ wherein R is an alkyl group having from 1 to 4 carbon atoms, and wherein any remainder is one or more monoethylenically unsaturated comonomer. Exemplary of particularly preferred comonomers are (a) styrene, $\alpha$-methylstyrene, methylmethacrylate, and acrylonitrile wherein such monomers or mixtures thereof are used in a total amount of not more than about 50 weight percent, based on the weight of the polymeric modifier and (b) hydroxyethyl acrylate, methacrylic acid and acrylic acid wherein such monomers or mixtures thereof are used in a total amount of not more than about 10 weight percent, based on the weight of the polymeric modifier. The modifier is conveniently added as a latex.

When the acids of the (b) component are employed (preferably at less than 5%), the amount of carboxyl is extremely small compared to the total quantity of epoxy resin and is relatively unavailable for crosslinking. In fact, at least a portion of them has been neutralized in the latex with ammonia to a pH of about 8 during its manufacture. The primary purpose of the acid in the latex is to enhance its freeze-thaw stability.

If the thermoplastic polymeric modifier is added to the epoxy resin in a form other than a latex, the acid comonomer can be eliminated, substituting therefor the other comonomer, hydroxyethylacrylate.

The polymeric modifiers described herein are useful as flexibilizing and adhesion promoting agents for use with a wide variety of the common epoxy resins including the polyglycidyl derivatives of (1) dihydric phenols; (2) alkyl-substituted dihydric phenols; (3) halogen-substituted dihydric phenols; (4) bisphenols represented by the formula

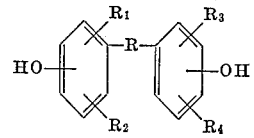

where R is selected from the group consisting of alkylene,

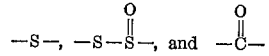

and wherein $R_1$, $R_2$, $R_3$, and $R_4$ are independently selected from the group consisting of hydrogen and halogen; and (5) polyoxyalkylene glycols. Such epoxy resins may be combined with any usual additive including epoxy curing agents such as the polyamines, dicarboxylic acid anhydrides and the catalytic curing agents such as $BF_3$-monoethylenamine, dicyandiamide, and the like.

Methods of preparing the compositions of the present invention and illustration of desirable and unexpected utility thereof, as adhesive coatings for metals, are illustrated in the following examples.

EXAMPLE 1

In each of a series of experiments, 100 parts by weight of an epoxy resin comprising essentially a liquid diglycidyl ether of 2,2-bis(4-hydroxyphenol)propane having an epoxide equivalent weight of 186–192 and a viscosity of 11,000 to 14,000 cps. at 77° F. was placed in a reactor and agitated while maintaining the temperature of the reactor at about 60° C. To the reactor was then individually added varying amounts of one of the polymeric latexes hereinafter identified as samples A and B (each latex containing 50 percent by weight of polymer solids). The resulting mixtures were each then heated to 90° C. and the vapor space purged with nitrogen to remove volatiles. Further heating of the mixtures to 150° C., under vacuum, accomplished removal of residual water. Thereafter, 6 parts of dicyandiamide and about 2 parts of silica aerogel were added and the mixture allowed to cool to normal room temperature while being agitated under atmospheric pressure. Individual test samples comprising two strips of steel .032 of an inch thick, 6 inches in length and 1 inch wide, were sandblasted at one end, spread with one of the adhesive formulations described herein and joined by forming a ½ inch overlap joint. Each strip was then cured at 200° C. for 30 minutes. The resulting bond strength of each of the individual samples was determined utilizing a commercial tensile test apparatus and observing the tensile shear required to produce a failure in the bond.

The following Table I identifies the samples used and the tensile shear strength observed.

TABLE I

| Sample No. | Modifying agent | Amount (phr.) based on wt. of latex polymer solids | Tensile shear Strength, p.s.i. |
|---|---|---|---|
| For comparison: 1 | None | 0 | 2,940 |
| This invention: | | | |
| 2 | A | 0.5 | 3,560 |
| | | 1.0 | 4,450 |
| | | 2.0 | 4,340 |
| 3 | B | 0.5 | 4,260 |
| | | 1.0 | 4,660 |
| | | 2.0 | 4,390 |

A =62.7% butyl acrylate, 34.3% acrylonitrile and 3.0% methacrylic acid.
B =66% ethyl acrylate, 32.5% methyl methacrylate, 1% methacrylic acid and 0.5% acrylic acid.

EXAMPLE 2

In each of a series of additional experiments, individual polymeric modifiers (hereinafter identified as samples C through H) were separately added, in the form of a latex containing 50 percent by weight of polymer solids, to the epoxy resin of Example 1 in an amount of about 2.3 parts of polymer solids per 100 parts of epoxy resin.

Each admixture was then heated to 90° C. and the vapor space purged with nitrogen to remove volatiles, then further heated to 150° C. under reduced pressure (29.5 mm. Hg). Thereafter, 8 parts of dicyandiamide, 5 parts of silica aerogel and 70 parts of aluminum powder (all based on the weight of the epoxy resin) were added and the mixtures allowed to cool to normal room temperatur while being agitated under atmospheric pressure. Each formulation was then tested as an adherent coating for steel by the procedures as described by the ASTM test No. D–1002 (Lap Shear Test) and No. D–1781 (Drum Peel Test).

The following Table II specifically identifies the polymeric modifiers used and the referred-to physical properties.

TABLE II

| Sample No. | Polymeric modifying agent | Tensile Properties | |
|---|---|---|---|
| | | Lap shear value, p.s.i. | Drum peel value, lb./in.$^2$ |
| For comparison: 4 | None | 5,500 | 1-2 |
| This invention: | | | |
| 5 | C | 6,680 | 4 |
| 6 | D | 5,920 | 6.8 |
| 7 | E | 7,000 | 22 |
| 8 | F | 6,870 | 6.7 |
| 9 | G | 5,480 | 9 |
| 10 | H | 5,810 | 6.8 |

C =66% ethyl acrylate, 1% methacrylic acid, 0.5% acrylic acid, 32.5% methylmethacrylate.
D =86.6% butyl acrylate, 3% methacrylic acid, 5% acrylonitrile, 5% hydroxyethyl acrylate.
E =87% ethyl acrylate, 3% methacrylic acid, 5% acrylonitrile, 4% hydroxyethyl acrylate.
F =68% butyl acrylate, 29% α-methylstyrene, 1.5% methacrylic acid, 1.5% acrylic acid.
G =46.5% butyl acrylate, 49.5% styrene, 1% methacrylic acid, 2% acrylic acid, 1% hydroxyethyl acrylate.
H =57.5% butyl acrylate, 3% methacrylic acid, 1% acrylic acid, 38.5% methylmethacrylate.

The data presented in Example 1 and 2 illustrate the unexpected usefulness of the polymeric modifiers of this invention for enhancing the adhesion and flexibility to metal of epoxy resins. It is to be understood that such polymeric modifiers may be employed successfully in any amount herein prescribed. Further, such polymeric modifiers may be added to the epoxy resin in the form of solutions, if desired, utilizing any convenient technique.

I claim:
1. A thermosettable resin mixture comprising essentially 100 parts by weight of a liquid epoxy resin selected from the group consisting of polyglycidyl ethers of polyhydric phenols and polyhydric alcohols having more than one 1,2-epoxy group per molecule and from about 0.5 to 5 parts of a thermoplastic polymeric modifier containing less than 5 weight percent of free acid which is compatible but essentially non-crosslinkable with said epoxy resin and which is composed of at least about 45 weight percent of a polymerized alkyl ester of acrylic acid containing from 1 to 4 carbon atoms in the alkyl constituent with any remainder being one or more monoethylenically unsaturated comonomers.

2. The resin mixture of claim 1 wherein said thermoplastic polymeric modifier is composed of at least about 45 weight percent of a polymerized alkyl ester of acrylic acid containing from 1 to 4 carbon atoms in the alkyl constituent and wherein said monoethylenically unsaturated comonomers are selected from the group consisting of (a) styrene, alpha-methylstyrene, methyl-methacrylate and acrylonitrile wherein the total amount of such comonomers or mixtures thereof is less than about 50 weight percent based on the weight of said thermoplastic polymeric modifier and (b), hydroxyethyl acrylate, methacrylic acid and acrylic acid wherein the total amount of such comonomers or mixtures thereof is less than about 10 weight percent based on the weight of said thermoplastic polymeric modifier and wherein the total amount of methacrylic acid and acrylic acid is less than 5 weight percent based on the weight of said thermoplastic polymeric modifier.

3. A method of enhancing the adhesion of thermosettable liquid epoxy resins selected from the group consisting of polyglycidyl ethers of polyhydric phenols and polyhydric alcohols having more than one 1,2-epoxy group per molecule to metals comprising adding to 100 parts of said epoxy resins, prior to curing said resins to a thermoset condition, of from 0.5 to 5 parts of a thermoplastic polymeric modifier containing less than 5 weight percent of free acid which is compatible but essentially non-crosslinkable with said epoxy resin and which is composed of at least about 45 weight percent of a polymerized alkyl ester of acrylic acid containing from 1 to 4 carbon atoms in the alkyl constituent with any remainder being one or more monoethylenically unsaturated comonomers.

4. The method of claim 3 wherein said thermoplastic polymeric modifier is composed of at least about 45 weight percent of a polymerized alkyl ester of acrylic acid containing from 1 to 4 carbon atoms in the alkyl constituent and wherein said monoethylenically unsaturated comonomers are selected from the group consisting of (a) styrene, alpha-methylstyrene, methyl methacrylate, and acrylonitrile wherein the total amount of such comonomers or mixtures thereof is less than about 50 weight percent based on the weight of said thermoplastic polymeric modifier and (b) hydroxyethyl acrylate, methacrylic acid and acrylic acid wherein the total amount of such comonomers or mixtures thereof is less than about 10 weight percent based on the weight of said thermoplastic polymeric modifier and wherein the total amount of methacrylic acid and acrylic acid is less than 5 weight percent based on the weight of said thermoplastic polymeric modifier.

References Cited

UNITED STATES PATENTS

| Re. 25,880 | 12/1965 | Cline | 260—837 |
| 3,129,198 | 4/1964 | Nix | 260—837 |

FOREIGN PATENTS 978,519  12/1964  Great Britain.

MURRAY TILLMAN, Primary Examiner

P. LIEBERMAN, Assistant Examiner

U.S. Cl. X.R.

260—47, 837